United States Patent
Kim

(10) Patent No.: US 8,913,326 B2
(45) Date of Patent: Dec. 16, 2014

(54) ZOOM LENS ASSEMBLY AND MOBILE TERMINAL THAT INCLUDES A ZOOM LENS ASSEMBLY

(75) Inventor: Hakhae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 336 days.

(21) Appl. No.: 13/404,273

(22) Filed: Feb. 24, 2012

(65) Prior Publication Data

US 2013/0100538 A1    Apr. 25, 2013

(30) Foreign Application Priority Data

Oct. 19, 2011 (KR) ........................ 10-2011-0106871

(51) Int. Cl.
| | | |
|---|---|---|
| G02B 15/14 | (2006.01) | |
| G02B 15/15 | (2006.01) | |
| G02B 13/00 | (2006.01) | |
| H04N 5/225 | (2006.01) | |
| H04N 5/232 | (2006.01) | |
| G02F 1/29 | (2006.01) | |
| H04M 1/02 | (2006.01) | |

(52) U.S. Cl.
CPC .......... *H04N 5/23296* (2013.01); *G02B 13/009* (2013.01); *H04M 2250/12* (2013.01); *G02F 2001/294* (2013.01); *H04N 5/2254* (2013.01); *H04M 1/0264* (2013.01)
USPC .......................................... 359/677; 359/676

(58) Field of Classification Search
USPC .................................................. 359/677, 679
See application file for complete search history.

(56) References Cited

U.S. PATENT DOCUMENTS

| | | | | |
|---|---|---|---|---|
| 4,466,703 | A * | 8/1984 | Nishimoto | 359/319 |
| 4,712,882 | A * | 12/1987 | Baba et al. | 359/655 |
| 6,081,388 | A | 6/2000 | Widl | |
| 6,898,021 | B1 | 5/2005 | Tang | |
| 7,369,327 | B1 * | 5/2008 | Nishioka | 359/726 |
| 2003/0189766 | A1 | 10/2003 | Nishioka | |
| 2004/0201901 | A1 * | 10/2004 | Nagata | 359/676 |
| 2006/0146416 | A1 * | 7/2006 | Lee | 359/676 |
| 2007/0247725 | A1 * | 10/2007 | Dowski et al. | 359/676 |
| 2009/0141232 | A1 * | 6/2009 | Cheng et al. | 349/200 |

FOREIGN PATENT DOCUMENTS

| | | |
|---|---|---|
| EP | 1 731 928 A2 | 12/2006 |
| WO | WO 2005/040909 A1 | 5/2005 |

* cited by examiner

*Primary Examiner* — Jordan Schwartz
(74) *Attorney, Agent, or Firm* — KED & Associates LLP

(57) ABSTRACT

A zoom lens assembly may enlarge/reduce an image without shifting a position of a lens set. A housing, a zoom lens unit and a drive unit may be provided. The zoom lens unit may include a plurality of lenses stationarily arranged within the housing by being spaced apart in prescribed distance from each other along an optic axis. The plurality of the lenses respectively have variable refractive indexes without a position shift. The drive unit may pressurize a prescribed one of the lenses to vary the refractive index of the prescribed lens. The controller may control the drive unit to change a focal distance of the zoom lens unit to enlarge or reduce an image.

18 Claims, 9 Drawing Sheets

(a)

(b)

(a)

(b)

(a)

(b)

ZOOM LENS ASSEMBLY AND MOBILE TERMINAL THAT INCLUDES A ZOOM LENS ASSEMBLY

CROSS-REFERENCE TO RELATED APPLICATION

This application claims benefit and priority from Korean Application No. 10-2011-0106871, filed Oct. 19, 2011, the subject matter of which is hereby incorporated by reference.

BACKGROUND

1. Field

Embodiments may relate to a zoom lens assembly and/or a mobile terminal that includes a zoom lens assembly. Embodiments may enlarge/reduce an image without shifting a position (or positions) of a lens set, decreasing a volume of a camera, and/or making better use of space.

2. Background

A mobile terminal is a device that may perform various functions. Examples of such functions may include data and voice communications, capturing images and video via a camera, recording audio, playing music files and outputting music via a speaker system, and/or displaying images and video on a display. Terminals may include additional functionality that supports game playing, while other terminals may also be configured as multimedia players. Mobile terminals may receive broadcast and multicast signals that permit viewing of contents, such as videos and television programs.

Terminals may be classified into mobile terminals and stationary terminals according to a presence or a non-presence of mobility. The mobile terminals may be further classified as handheld terminals and vehicle mount terminals according to availability for hand-carry.

Ongoing efforts may support and increase functionality of mobile terminals. Such efforts may include software and hardware improvements, as well as changes and improvements in structural components that form the mobile terminal.

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, reference may be made to the accompanying drawing figures that form a part hereof, and that show by way of illustration specific embodiments. It is to be understood by those of ordinary skill in this technological field that other embodiments may be utilized, and structural, electrical, as well as procedural changes may be made without departing from the scope of embodiments of the present invention. Same reference numbers may be used throughout the drawings to refer to same or similar parts.

As used herein, suffixes 'module', 'unit' and 'part' may be used for elements in order to facilitate the disclosure. Therefore, significant meanings or roles may not be given to the suffixes themselves and it is understood that the 'module', 'unit' and 'part' may be used together or interchangeably.

Embodiments may be applicable to various types of terminals. Examples of such terminals may include mobile as well as stationary terminals, such as mobile phones, user equipment, smart phones, DTV, computers, digital broadcast terminals, personal digital assistants, portable multimedia players (PMP) and/or navigators.

By way of non-limiting example, a further description may be made with regard to a mobile terminal 100, and it should be noted that such teachings may apply equally to other types of terminals.

Figure 1:
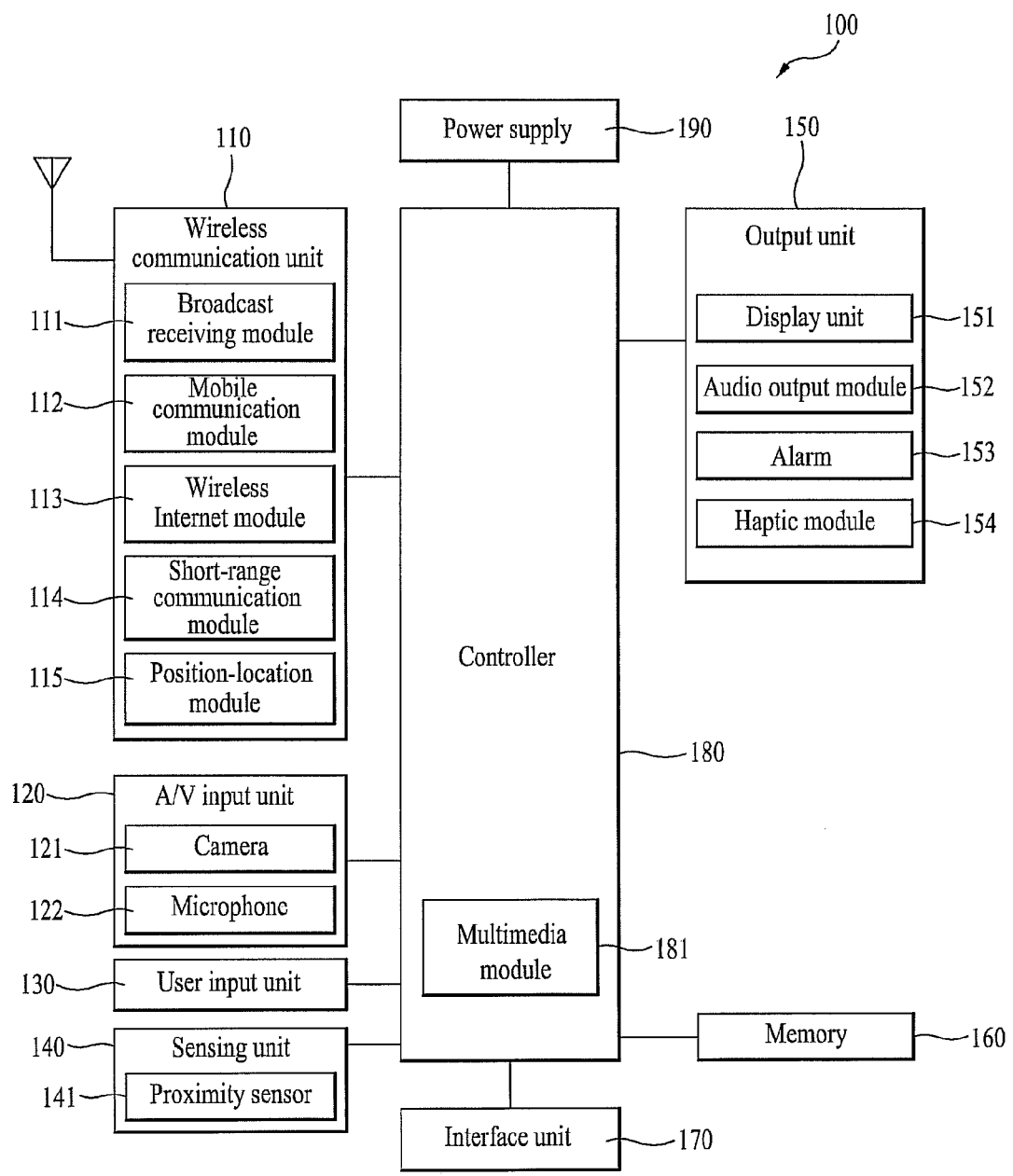
FIG. 1 is a block diagram of a mobile terminal in accordance with an embodiment.

FIG. 1 is a block diagram of a mobile terminal 100 in accordance with an embodiment. FIG. 1 shows the mobile terminal 100 having various components, although it is understood that implementing all of the illustrated components is not a requirement. Greater or fewer components may alternatively be implemented.

FIG. 1 shows a wireless communication unit 110 configured with several commonly implemented components. For example, the wireless communication unit 110 may include one or more components that permit wireless communication between the mobile terminal 100 and a wireless communication system or network within which the mobile terminal 100 is located. In an example of non-mobile terminals, a wire communication unit may be used rather than the wireless communication unit 110. The wireless communication unit 110 and/or the wire communication unit may be commonly referred to as a communication unit.

A broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided to the mobile terminal 100 in pursuit of simultaneous receptions of at least two broadcast channels or broadcast channel switching facilitation.

Examples of broadcast associated information may include information associated with a broadcast channel, a broadcast program, a broadcast service provider, etc. For example, the broadcast associated information may include an electronic program guide (EPG) of digital multimedia broadcasting (DMB) and an electronic service guide (ESG) of digital video broadcast-handheld (DVB-H).

The broadcast signal may be implemented, for example, as a TV broadcast signal, a radio broadcast signal, and/or a data broadcast signal. The broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals may also be possible. Data received by the broadcast receiving module 111 may also be stored in a suitable device, such as a memory 160.

A mobile communication module 112 may communicate wireless signals with one or more network entities such as a base station or a Node-B. Such signals may represent audio, video, multimedia, control signaling, and/or data, for example.

A wireless internet module 113 may support Internet access for the mobile terminal 100. The wireless internet module 113 may be internally or externally coupled to the mobile terminal 100. Suitable technologies for wireless internet may include, but are not limited to, WLAN (Wireless LAN)(Wi-Fi), Wibro (Wireless broadband), Wimax (World Interoperability for Microwave Access), and/or HSDPA (High Speed Downlink Packet Access). In non-mobile terminals, a wire internet module may be used rather than the wireless internet module 113. The wireless internet module 113 and the wire internet module may be referred to as an internet module.

A short-range communication module 114 may facilitate relatively short-range communications. Suitable technologies for short-range communication may include, but are not limited to, radio frequency identification (RFID), infrared data association (IrDA), ultra-wideband (UWB), as well as the networking technologies referred to as Bluetooth and ZigBee.

A position-location module 115 (or GPS module) may identify or otherwise obtain a location (or position) of the mobile terminal 100. The position-location module 115 may be implemented using, for example, global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then applying triangulation to the calculated information. Location and time information may be calculated using three satellites, and errors of the calculated location position and time information may then be amended using another satellite. The position-location module 115 may calculate speed information by continuously calculating a real-time current location.

An audio/video (A/V) input unit 120 may provide audio or video signal input to the mobile terminal 100. As shown, the A/V input unit 120 includes a camera 121 and a microphone 122. The camera 121 may receive and process image frames of still pictures or video.

A microphone 122 may receive an external audio signal while the portable device is in a particular mode, such as a phone call mode, a recording mode or a voice recognition mode. This audio signal may be processed and converted into digital data.

The portable device, and more specifically the A/V input unit 120, may include assorted noise removing algorithms (or noise reducing algorithms) to remove (or reduce) noise generated in the course of receiving the external audio signal. Data generated by the A/V input unit 120 may be stored in the memory 160, utilized by the output unit 150, and/or may be transmitted via one or more modules of the wireless communication unit 110. Two or more microphones and/or cameras may also be used.

A user input unit 130 may generate input data responsive to user manipulation of an associated input device or devices. Examples of such devices may include a keypad, a dome switch, a touchpad such as static pressure/capacitance, a jog wheel and a jog switch, for example. The user input unit 130 may be configured as a touchpad in cooperation with a display, which may be described in more detail below.

A sensing unit 140 may provide status measurements of various aspects of the mobile terminal 100. For example, the sensing unit 140 may detect an open/close status of the mobile terminal 100, relative positioning of components such as a display and a keypad of the mobile terminal 100, a change of position of the mobile terminal 100 or a component of the mobile terminal 100, a presence or absence of user contact with the mobile terminal 100, and/or orientation or acceleration/deceleration of the mobile terminal 100.

If the mobile terminal 100 is configured as a slide-type mobile terminal, the sensing unit 140 may sense whether a sliding portion of the mobile terminal 100 is open or closed. Other examples may include the sensing unit 140 that senses the presence or absence of power provided by the power supply 190, the presence or absence of a coupling or other connection between the interface unit 170 and an external device.

The interface unit 170 may couple the mobile terminal 100 with external devices. The external devices may include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, and/or removable user identity module (RUIM) card.

When the mobile terminal 110 is connected to an external cradle, the interface unit 170 may become a passage for supplying the mobile terminal 100 with power from the cradle or a passage for delivering various command signals inputted from the cradle by a user to the mobile terminal 100. Each of the various command signals inputted from the cradle or the power may operate as a signal enabling the mobile terminal 100 to recognize that it is correctly loaded in the cradle.

An output unit 150 may include various components that support output requirements of the mobile terminal 100. A display 151 may visually display information associated with the mobile terminal 100. For example, if the mobile terminal 100 is operating in a phone call mode, the display 151 may provide a user interface or graphical user interface that includes information associated with placing, conducting, and/or terminating a phone call. As another example, if the mobile terminal 100 is in a video call mode or a photographing mode, the display 151 may additionally or alternatively display images associated with these modes.

One implementation includes the display 151 configured as a touch screen that works in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and/or a three-dimensional (3D) display.

Some of the displays may be configured transparent so that an external environment can be seen through the corresponding display. Such a display may be called a transparent display. As a representative example for the transparent display, may be a transparent LCD display or the like.

The mobile terminal 100 may include one or more displays 151. An example of a two-display embodiment is one in which one display 151 is configured as an internal display viewable when the mobile terminal 100 is in an opened position and a second display 151 configured as an external display viewable in both open and closed positions.

The touchscreen can be configured to detect a touch input pressure as well as a touch input position and size.

A proximity sensor 141 may be provided within or around the touchscreen. The proximity sensor may detect an object approaching a prescribed detecting surface or a presence or non-presence of an object existing around itself using an electromagnetic power or infrared rays without mechanical contact. The proximity sensor may be superior to a contact sensor in lifespan and utilization.

An example for an operational principle of the proximity sensor may be explained as follows. If an object approaches a sensor detecting surface while an oscillation circuit oscillates a sine radio frequency, an oscillation amplitude of the oscillation circuit may attenuate or stop. This change may be converted to an electric signal to detect a presence or a non-presence of the object. Even if any material except a metallic material comes between the RF oscillation proximity sensor and the object, a proximity switch may detect the object without interference with the material.

In spite of not providing the proximity sensor, if the touchscreen is electrostatic, the touch screen may detect proximity of a pointer through an electric field change attributed to proximity of the pointer.

In an example that the pointer is in vicinity of the touchscreen without actually contacting the touchscreen, the mobile terminal is able to detect a position of the pointer and a distance between the pointer and the touchscreen. For clarity and ease of explanation, an action for enabling the pointer approaching the touchscreen to be recognized as placed on the touchscreen may be called 'proximity touch' and an action of enabling the pointer to actually contact the touchscreen may be called 'contact touch'. A position at which the proximity touch is made to the touchscreen using the pointer may mean a position of the pointer vertically corresponding to the touchscreen when the pointer makes the proximity touch.

If the proximity sensor is used, it may sense a proximity touch and its pattern (e.g., proximity touch distance, proximity touch direction, proximity touch speed, proximity touch position, proximity touch moving state, etc.). The proximity sensor may also output information corresponding to the sensed proximity touch action and the proximity touch pattern to the touchscreen.

FIG. 1 further shows the output unit 150 having an audio output module 152 that supports audio output requirements of the mobile terminal 100. The audio output module 152 may be implemented using one or more speakers, buzzers, other audio producing devices, and/or combinations thereof.

The audio output module 152 may function in various modes such as a call-receiving mode, a call-placing mode, a recording mode, a voice recognition mode and/or a broadcast reception mode. During operation, the audio output module 152 may output audio relating to a particular function or status, such as a call received, a message received, and/or errors.

The output unit 150 may have an alarm 153, which may be used to signal or otherwise identify the occurrence of a particular event associated with the mobile terminal 100. The events may include a call received, a message received and/or a user input received.

An example of a signal provided by the output unit 150 may be tactile sensations. For example, the alarm 153 may vibrate responsive to the mobile terminal 100 receiving a call or a message. As another example, vibration may be provided by the alarm 153 responsive to receiving a user input at the mobile terminal 100, thereby providing a tactile feedback mechanism. Various signals provided by components of the output unit 150 may be separately performed or may be performed using any combination of such components.

A memory 160 may be used to store various types of data to support processing, control, and storage requirements of the mobile terminal 100. Examples of such data may include program instructions for applications operating on the mobile terminal 100, contact data, phonebook data, messages, pictures, and/or video.

Data for various patterns of vibration and/or sound outputted in an example of a touch input to the touchscreen may be stored in the memory 160.

Since map information may be stored in the memory 160, a user's convenience may be further provided in a manner of providing the map information to a user when necessary. Moreover, a recent use history or a cumulative use frequency of each menu in the mobile terminal 100 may be stored in the memory 160.

The memory 160 (shown in FIG. 1) may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, and/or other similar memory or data storage device.

A controller 180 may control overall operations of the mobile terminal 100. For example, the controller 180 may perform control and processing associated with voice calls, data communications, instant message communication, video calls, camera operations and/or recording operations.

The controller 180 may include a multimedia module 181 that provides a multimedia playback. The multimedia module 181 may be configured as part of the controller 180, and/or may be implemented as a separate component.

The controller 180 may perform a pattern recognizing process for recognizing a writing input and a picture drawing input carried out on the touchscreen as characters or images, respectively.

A power supply 190 may provide power required by various components for the mobile terminal 100. The power may be internal power, external power, and/or combinations thereof.

Various embodiments described herein may be implemented in a computer-readable medium using, for example, computer software, hardware, and/or some combination thereof. For a hardware implementation, embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform functions described herein, and/or a selective combination thereof. Such embodiments may also be implemented by the controller 180.

For a software implementation, embodiments described herein may be implemented with separate software modules, such as procedures and functions, each of which may perform one or more of the functions and operations described herein. The software codes may be implemented with a software application written in any suitable programming language and may be stored in memory such as the memory 160, and may be executed by a controller or processor, such as the controller 180.

The mobile terminal 100 may be implemented in a variety of different configurations. Examples of such configurations may include a folder-type, a slide-type, a bar-type, a rotational-type, a swing-type and/or combinations thereof. For clarity, a further disclosure may primarily relate to a slide-type mobile terminal 100. However, such teachings may apply equally to other types of mobile terminals.

Figure 2:
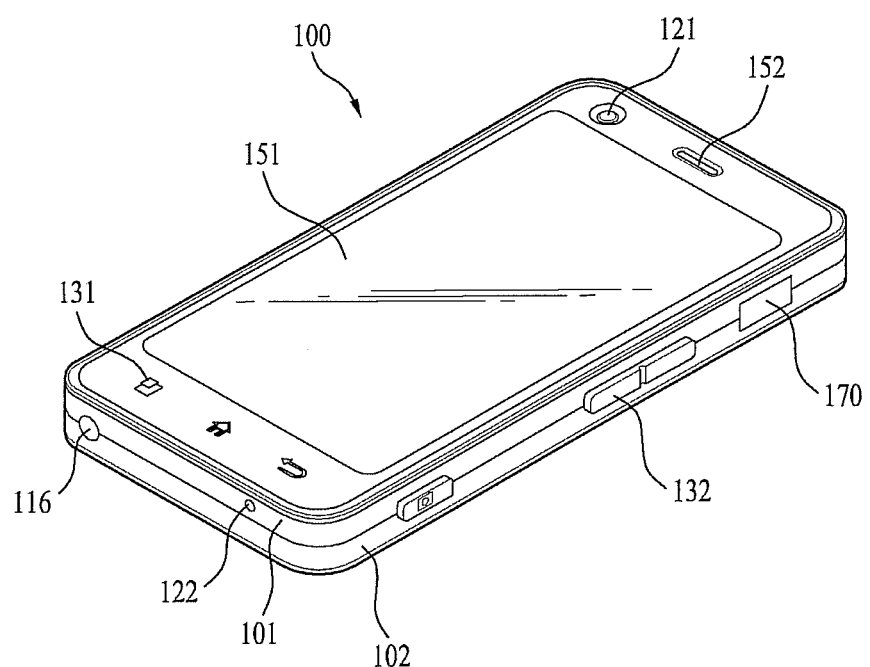
FIG. 2 is a front perspective diagram of a mobile terminal according to one embodiment.

FIG. 2 is a front perspective diagram of a mobile terminal according to one embodiment. Other arrangements and embodiments may also be provided.

The mobile terminal 100 may be a bar type terminal body, although other embodiments may be provided. The mobile terminal 100 may be implemented in a variety of different configurations. Examples of such configurations may include a slide type, a folder type, a swing type, a swivel type and/or the like, in which at least two bodies are assembled to enable relative motion.

Referring to FIG. 2, a body of the mobile terminal 100 may include a case (e.g., a casing, a housing, a cover, etc.) configuring an exterior thereof. The case may be divided into a front case 101 and a rear case 102. Various electric/electronic parts may be loaded in a space provided between the front case 101 and the rear case 102. At least one middle case may be further provided between the front case 101 and the rear case 102.

The front and rear cases 101 and 102 may be formed by injection molding of synthetic resin or metal substance such as stainless steel (STS), titanium (Ti) and/or the like, for example.

A display 151, an audio output unit 152, a camera 121, a user input unit 130 (131/132), a microphone 122, an interface 170 and/or the like may be provided to the terminal body, and more specifically to the front case 101.

The display 151 may occupy most of a main face of the front case 101. The audio output unit 151 and the camera 121 may be provided to an area adjacent to one of both end portions of the display 151, while the user input unit 131 and the microphone 122 may be provided to another area adjacent to the other end portion of the display 151. The user input unit 132, the interface 170 and/or the like may be provided to lateral sides of the front and rear cases 101 and 102.

The user input unit 130 may be manipulated to receive an input of a command for controlling an operation of the mobile terminal 100. The input unit 130 may include a plurality of manipulating units 131 and 132. The manipulating units 131 and 132 may be referred to as a manipulating portion and may adopt any mechanism of a tactile manner that enables a user to perform a manipulating action by experiencing a tactile feeling.

Contents inputted by the manipulating units 131 and 132 may be set in various ways. For example, such a command as start, end, scroll and/or the like may be inputted to the first manipulating unit 131. A command for a volume adjustment of sound outputted from the audio output unit 152, a command for a switching to a touch recognizing mode of the display 151 and/or the like may be inputted to the second manipulating unit 132.

Figure 3:
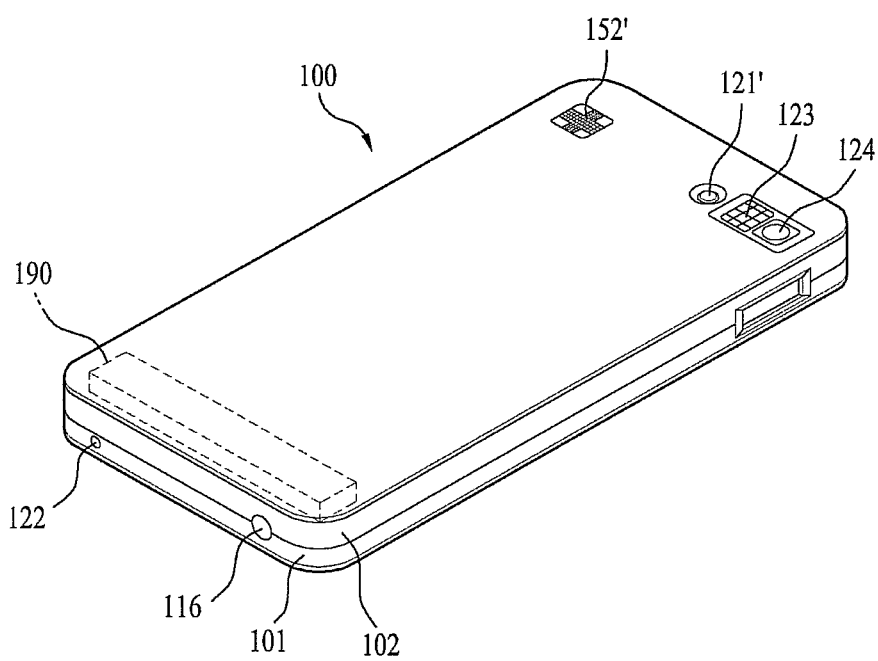
FIG. 3 is a rear perspective diagram of a mobile terminal according to one embodiment.

FIG. 3 is a perspective diagram of a backside of the mobile terminal 100 shown in FIG. 2.

FIG. 3 shows that a camera 121' may be additionally provided to a backside of the terminal body, and more particularly to the rear case 102. The camera 121' may have a photographing direction that is substantially opposite to that of the former camera 121 (FIG. 2) and may have pixels differing from those of the former camera 121.

For example, the former camera 121 may have low pixels enough to take and transmit a picture of user's face for a video call, while the latter camera 121' may have high pixels for capturing a general subject for photography without transmitting the captured subject. Each of the cameras 121 and 121' may be installed at the terminal body to be rotatable or popped up.

A flash 123 and a mirror 124 may be additionally provided adjacent to the camera 121'. The flash 123 may project light toward a subject in case of photographing the subject using the camera 121'. In an example that a user attempts to take a picture of the user (self-photographing) using the camera 121', the mirror 124 may enable the user to view the user's face reflected by the mirror 124.

An additional audio output unit 152' may be provided to the backside of the terminal body. The additional audio output unit 152' may implement a stereo function together with the former audio output unit 152 (FIG. 2) and may be used for implementation of a speakerphone mode in case of talking over the mobile terminal.

A broadcast signal receiving antenna 124 may be additionally provided to the lateral side of the terminal body as well as an antenna for communication or the like. The antenna 124 constructing a portion of the broadcast receiving module 111 (FIG. 1) may be retractably provided to the terminal body.

A power supply unit 190 for supplying a power to the mobile terminal 100 may be provided to the terminal body. The power supply unit 190 may be built within the terminal body. Alternatively, the power supply unit 190 may be detachably connected to the terminal body.

A touchpad 135 for sensing a touch may be further provided to the rear case 102. The touchpad 135 may be configured as a light-transmittive type such as the display 151. In this example, if the display 151 is configured to output visual information from both sides, the visual information may be recognized through the touchpad 135. The information outputted from both of the sides may be controlled by the touchpad 135. Alternatively, if a display is additionally provided to the touchpad 135, a touchscreen may be provided to the rear case 102 as well.

The touchpad 135 may operate by interconnecting with the display 151 provided to the front case 101. The touchpad 135 may be arranged in parallel with a front side or a rear side of the display 151. A size of the touchpad 135 may be equal to or smaller than the display 151.

Figure 4:
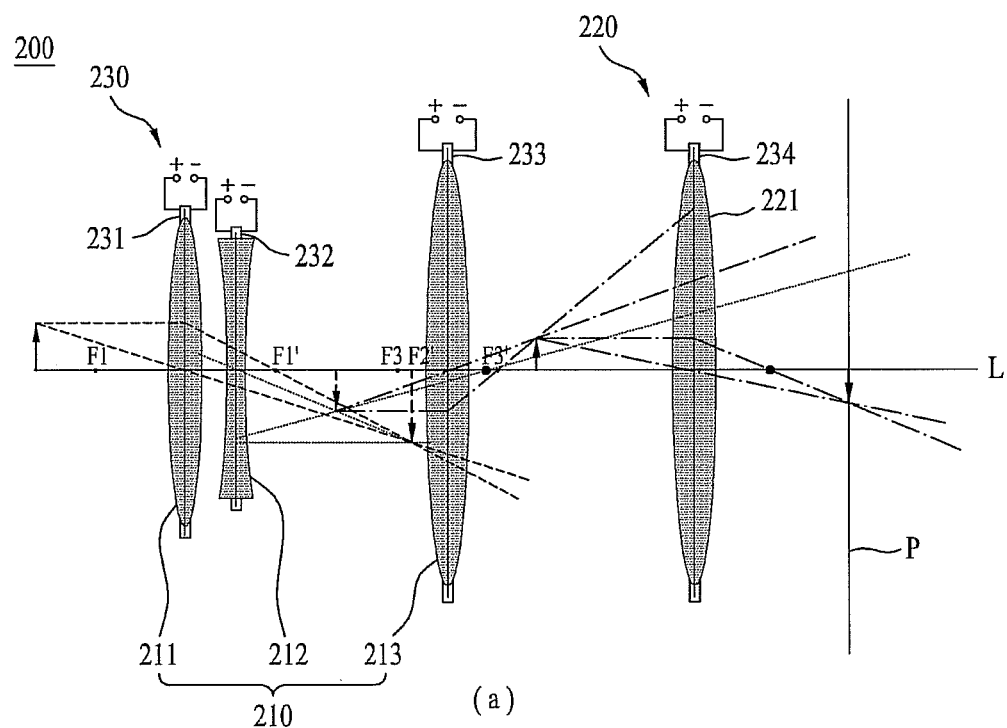
FIG. 4 is a diagram for a concept of a zoom lens assembly according to one embodiment.
Figure 4:
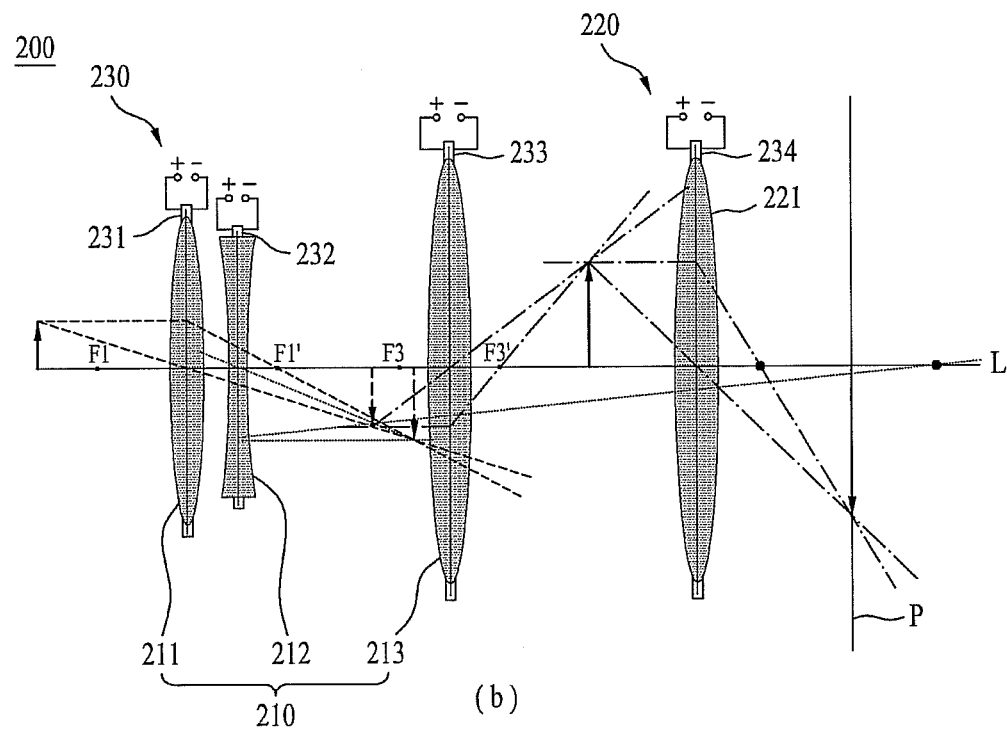
Figure 5:
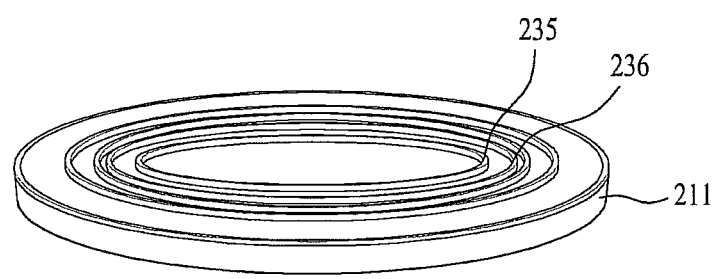
FIG. 5 is a diagram of a lens included in a zoom lens assembly.
Figure 5:
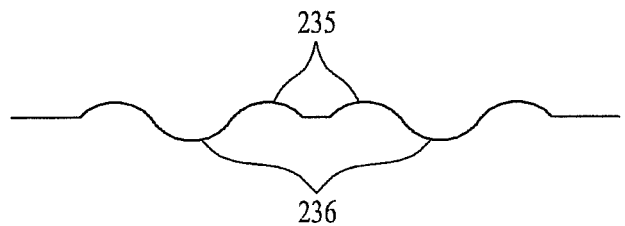

FIG. 4 is a diagram for a concept of a zoom lens assembly 200 according to one embodiment. FIG. 5 is a diagram of a lens included in a zoom lens assembly. Other arrangements and embodiments may also be provided.

Referring to FIG. 4 and FIG. 5, a zoom lens assembly 200 according to one embodiment may include a housing, a zoom lens unit 210, a drive unit 230, and the controller 180. The zoom lens unit 210 may include a plurality of lenses that are stationarily arranged within the housing by being spaced apart (a prescribed distance from each other) along an optic axis, and the plurality of the lenses respectively having variable refractive indexes without a position shift. The drive unit 230 may pressurize a prescribed one of the lenses to vary a refractive index of the prescribed lens. The controller 180 may control the drive unit 230 to change a focal distance of the zoom lens unit 210 to enlarge or reduce an image.

According to another embodiment, the zoom lens assembly 200 may include a housing, a zoom lens unit 210, a drive unit 230 and the controller 180. The zoom lens unit 210 may include a plurality of lenses that are stationarily arranged within the housing by being spaced apart (a prescribed distance from each other) along an optic axis, and the plurality of the lenses respectively having variable refractive indexes without a position shift. The drive unit 230 may apply an electric signal to a prescribed one of the lenses to vary a refractive index of the prescribed lens. The controller 180 may control the drive unit 230 to change a focal distance of the zoom lens unit 210 to reduce or enlarge an image.

Each of the lenses (configuring the zoom lens unit 210) may be formed of a material to enable a refractive index of the corresponding lens to become variable without a position shift. For example, if the lens is formed of a polymer, the lens may have a refractive index that varies in accordance with a size and a direction of a pressure applied to the lens.

For another example, each of the lenses may be formed of a liquid crystal. In this example, arrangement of the liquid crystal of the lens may change in accordance with strength of an electric field, whereby the refractive index of the lens may vary.

As previously described, the mobile terminal 100 may include at least one camera, (reference number 121 shown in FIG. 2). The camera 121 may include the zoom lens assembly 200 for enlargement/reduction of an image.

In order to implement a zoom function, a focal distance of the zoom lens unit 210 may change in accordance with magnification of enlargement/reduction. As discussed above with regard to other arrangements, a focal distance of a camera, according to an example arrangement, may be adjusted by shifting a plurality of lenses of the zoom lens unit 210 along an optic axis.

Embodiments may provide a zoom lens assembly and a mobile terminal, by which an image may be enlarged or reduced without shifting a position of a lens set (i.e., maintaining a position of a lens set).

The zoom lens assembly 200 may include a housing, indicated by a reference number 301/401 (FIG. 8/FIG. 9), a zoom lens unit 210 and a drive unit 230. The zoom lens unit 210 may be stationarily arranged within the housing by being spaced apart along an optic axis L. The zoom lens unit 210 may include a plurality of lenses 211 to 213 respectively having variable refractive indexes. The drive unit 230 may pressurize a prescribed one of the lenses 211 to 213 or apply an electric signal to the prescribed one of the lenses 211 to 213 to vary a refractive index of the prescribed one of the lenses 211 to 213. The controller 180 may enlarge or reduce an image by varying refractive indexes of the lenses 211 to 213 by applying an electric signal to the drive unit 230 and changing a focal distance of the zoom lens unit 210.

The mobile terminal 100 may include a camera having the zoom lens assembly 200. The camera may include a zoom lens unit 210 stationarily arranged within the housing by being spaced apart along an optic axis L. The zoom lens unit 210 may include a plurality of lenses 211 to 213 respectively having variable refractive indexes or angles. The drive unit 230 may pressurize a prescribed one of the lenses 211 to 213 or apply an electric signal to the prescribed one of the lenses 211 to 213 to vary the refractive index or angle of the prescribed one of the lenses 211 to 213.

The mobile terminal 100 may include a display 151 and the controller 180 to enlarge or reduce an image in a manner of varying the refractive indexes or angles of the lenses by applying an electric signal to the drive unit 230 and changing a focal distance of the zoom lens unit 210.

As shown in FIG. 4, the zoom lens assembly 200 may include a zoom lens unit 210 and a compensation lens unit 220. The zoom lens unit 210 and the compensation lens unit 220 may be fixed such that they maintain a predetermined space between each other, and along an optic axis L.

Positions of the zoom lens unit 210 and the compensation lens unit 220 may not shift to enlarge or reduce an image. The zoom lens unit 210 and the compensation lens unit 220 may maintain the predetermined space in-between each other.

The zoom lens unit 210 may include at least one lens (not shown) for aberration correction and at least one or more lenses 211 to 213 for a zoom function. Positions of the at least one lens for aberration correction and the at least one or more lenses 211 to 213 for the zoom function are not changed. The at least one lens for aberration correction and the at least one or more lenses 211 to 213 for the zoom function are fixed on the optic axis L by maintaining a predetermined space in-between.

Regarding the at least one or more lenses 211 to 213 for the zoom function, if a shape of a prescribed one of the lenses 211 to 213 or a strength of an electric field of the corresponding lens is changed by a voltage applied to a prescribed one of the drive units 231 to 233 respectively provided to the lenses 211 to 213, a refractive index or an angle of the corresponding lens 211, 212 or 213 may vary to change a focal distance of the zoom lens unit 210, whereby the zoom function may be performed.

The compensation lens unit 220 may include a lens (not shown) for aberration correction and a focal correction lens 221 for forming a focus on an image plane P. Positions of the lens for the aberration correction and the focal correction lens 221 may not change for image enlargement or image reduction. The lens for the aberration correction and the focal correction lens 221 may be fixed on the optic axis L by maintaining a predetermined space in-between.

If a shape or an electric field strength of the focal correction lens 221 changes for the image enlargement or reduction by a voltage applied to the drive unit 234 provided to the corresponding lens, a refractive index or angle of the corresponding lens 221 may change, although the image plane P may be constantly maintained.

In particular, if a shape or an electric field strength of a lens artificially changes by the drive unit 230 without a position shift of the corresponding lens, a curvature radius and a focal distance of the corresponding lens may change. This may perform the same function as shifting a position of each lens.

Since the position of each lens does not need to be changed, the zoom lens assembly 200 may be configured slimmer and more compact. By controlling a level of a voltage applied to the drive unit 230, an enlargement/reduction function may be more precisely provided.

FIG. 4 only shows the lenses 211 to 213 for the zoom function of the zoom lens unit 210 and the focal correction lens 221 of the compensation lens unit 220. The remainder of the lenses discussed above may also be provided. FIG. 4 shows one operating state of the zoom lens assembly 200 for enlarging an image.

The lenses 211 to 213 for the zoom function of the zoom lens unit 210 and the focal correction lens 221 of the compensation lens unit 220 may vary their shapes and may be formed of a light-transmittive material. For example, this light-transmittive material may include a polymer and/or liquid crystals.

If the lens 221 is formed of a polymer, it may vary the shape of the lens 221 by applying pressurization to the lens 221. If the lens 221 is formed of liquid crystals, alignment of the liquid crystals within the lens 221 may be modified to change a corresponding refractive index or angle.

As shown in FIG. 4, the drive unit 230 may include piezoelectric (PZT) devices 231 to 234 to change shapes of the lenses 211, 212, 213 and 221 by electric signals, respectively.

The drive unit 230 may include a terminal to vary a strength of an electric field of the corresponding lens. The drive unit 230 may change a shape or electric field strength of the lens by an electric signal applied via the mobile terminal.

The piezoelectric device may be provided to one side of each of the lens to cause a shape modification by pressurizing the corresponding lens. For example, the piezoelectric devices 231 to 234 may be provided to circumferential portions of the lenses 211, 212, 213 and 221, thereby providing pressurizing forces along radial directions R of the lenses 211, 212, 213 and 221 or a direction of the optic axis L, respectively.

As shown in FIG. 5, the drive unit 230 may include a plurality of piezoelectric rings 235 and 236 provided in a radial direction to one face of the lens (e.g., lens 221). The piezoelectric rings 235 and 236 may be provided to a front or back face of the lens 221 and may be preferably formed of a light-transmittive material.

A plurality of the piezoelectric rings 235 and 236 may be provided as concentric circles along the radial direction of the lens 221. The controller 180 may apply an electric signal to each of the piezoelectric rings 235 and 236 to enable one face of the lens 221 to have various curvatures along the radial direction.

If the surface of the lens 221 is modified to have any one of the various curvatures, it may improve the aberration effect generated from the lens. Moreover, it may reduce the number of lenses used for the aberration improvement of the related art.

Figure 6:
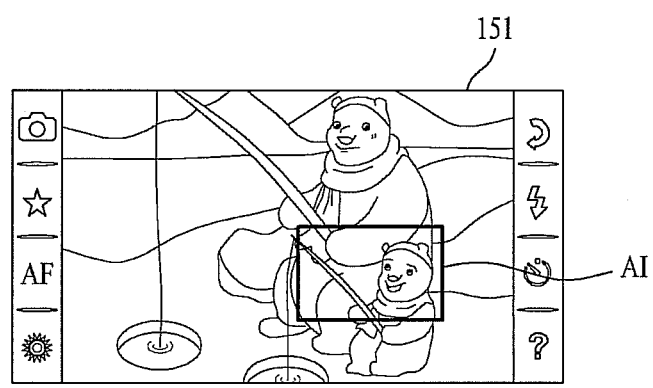
FIG. 6 is a diagram to describe an operating state of a mobile terminal according to one embodiment.
Figure 6:
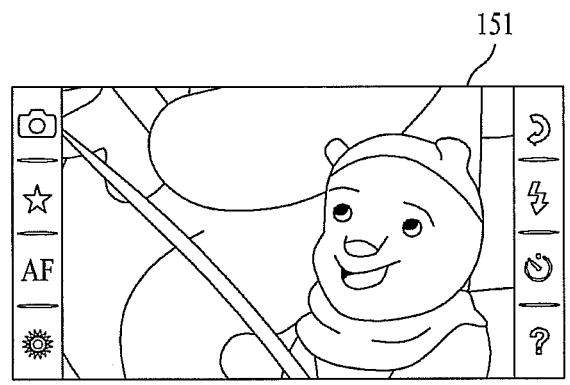
Figure 7:
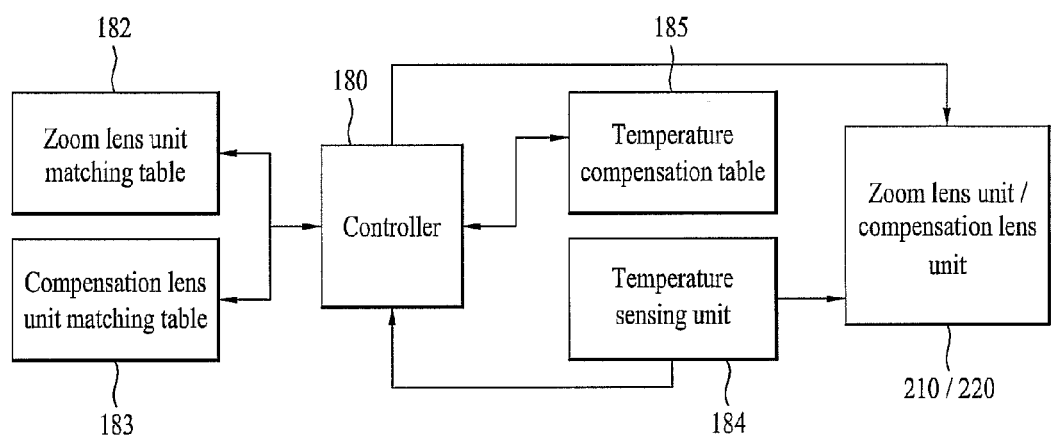
FIG. 7 is a block diagram of a zoom lens assembly according to one embodiment.

FIG. 6 is a diagram to describe an operating state of a mobile terminal 100 according to one embodiment. FIG. 7 is a block diagram of a zoom lens assembly 200 according to one embodiment. Other arrangements and embodiments may also be provided.

Referring to FIG. 6, in order to enlarge or reduce an image frame displayed on the display 151, a user may select a partial area A1 or a whole area of the image frame. The controller 180 may then display the partial area A1 in a manner of enlarging or reducing the partial area A1 in accordance with a ratio desired by a user or a preset ratio.

A variation of the lens by a ratio of enlargement or reduction may be determined based on an applied voltage. Values of the variation may be saved (in advance) in various tables.

As shown in FIG. 7, the zoom lens assembly 200 may include a zoom lens unit matching table 182 and a compensation lens unit matching table 183. Voltage values applied to the zoom lens unit 210 and enlargement/reduction ratios corresponding to the voltage values may be saved in the zoom lens unit matching table 182. Voltage values applied to the compensation lens unit 220 and enlargement/reduction ratios corresponding to the voltage values may be saved in the compensation lens unit matching table 183.

Each of the shape-variable lenses 211 to 213 may have a predetermined normal temperature range. If each of the shape-variable lenses 211 to 213 deviates from the normal temperature range, a variation due to an applied voltage may change. Accordingly, it may be necessary to compensate for the changing variation.

In particular, when the zoom lens assembly 200 is exposed to an external environment, the shape-variable lenses 211 to 213 may have a soft or a hard property based on a peripheral temperature change, which may not match a previously determined power-variation relation. Accordingly, it may be necessary to determine a compensation value based on a temperature in advance. The corresponding data may be saved (in advance) in a temperature compensation table 185.

The zoom lens assembly 200 may further include a temperature sensor 184 to sense a temperature. The temperature sensor 184 may be provided to the controller 180 or within the zoom lens assembly 200. Alternatively, the temperature sensor 814 may be provided to one side of the mobile terminal 100. In this example, the controller 180 may compensate for a focal position of the zoom lens unit in accordance with the sensed temperature.

In particular, while the zoom lens assembly 200 is operating, if a temperature of the zoom lens assembly 200 deviates from a normal temperature range according to the temperature sensor 184, a power may be applied to each of the lenses 211, 212, 213 and 221 by applying compensating values obtained from the temperature compensation table 185. This temperature compensation information may be provided to the temperature compensation table 185 in a manner of identically applying to the lenses 211 to 213 of the zoom lens unit 210 and the lens 221 of the compensation lens unit 220.

Meanwhile, in the controller 180, a drive circuit for controlling the zoom lens unit 210 and the compensation lens unit 220 may be implemented into one chip. The controller 180 may obtain information from the zoom lens unit matching table 182 and the compensation lens unit matching table 182, in which enlargement/reduction ratios and voltage control values may be matched to each other. The controller 180 may obtain information from the temperature sensor 184 and the temperature compensation table 185 to compensate for an amount of lens forming material, which may change by curvature and voltage in accordance with a temperature.

Figure 8:
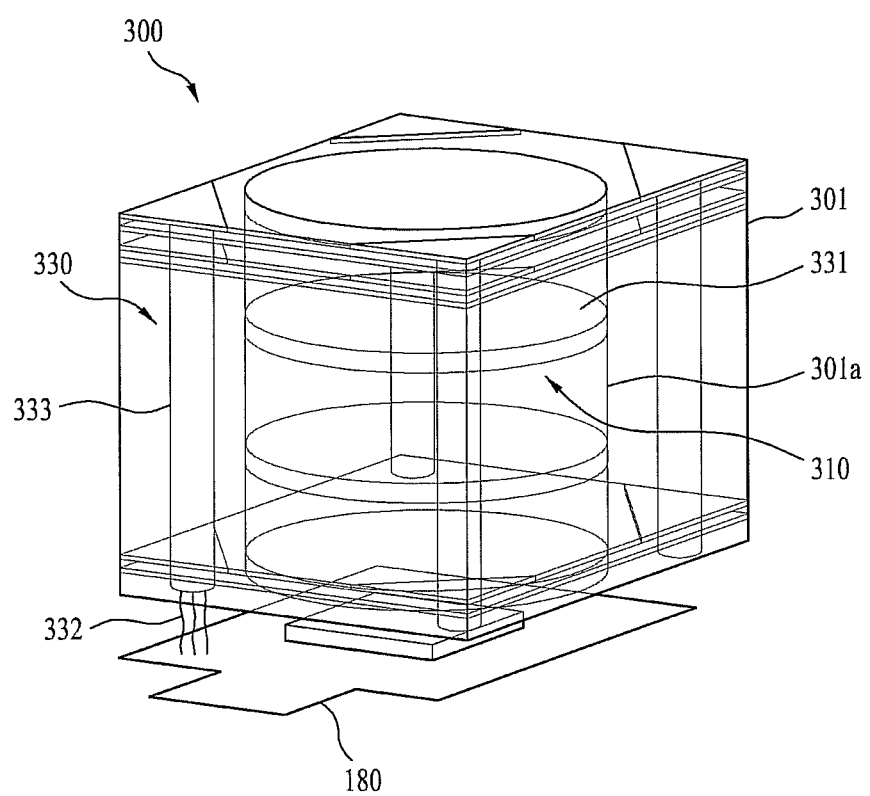
FIG. 8 is a perspective diagram to describe a zoom lens assembly according to one embodiment.

FIG. 8 is a perspective diagram to describe a zoom lens assembly according to one embodiment. Other arrangements and embodiments may also be provided.

As shown in FIG. 8, the drive unit may include a piezoelectric device mounted on a lens 310 and a plurality of wires 332 electrically connecting the controller 180 to the corresponding piezoelectric device.

A plurality of lenses 310 may be provided within a housing 301 by being fixed thereto individually or in one body.

The housing 301 may be able to fix (or maintain) positions of a plurality of the lenses 310 such that a plurality of the lenses 310 are spaced apart in a predetermined distance from each other. In particular, a plurality of the lenses 310 may include the lenses 211 to 213 of the zoom lens unit 210 (described with reference to FIG. 4) and may further include the focus compensation lens 221 of the compensation lens unit 220.

Both the zoom lens unit 210 and the compensation lens unit 220 may be received in the housing 301. In particular, the housing 301 may have a polyhedral or cylindrical configuration and may have a hole 301a provided to a position at which the lenses 310 are situated to be exposed along an optic axis.

The piezoelectric device may be provided to a circumferential portion of each of the lenses, as described with reference to FIG. 4. Alternatively, the piezoelectric device may be provided to one face of each of the lenses, as described with reference to FIG. 5. FIG. 8 shows a case that the piezoelectric device is provided to one face of each of the lenses. In this example, a terminal for electrical connection may be provided to the piezoelectric device.

The piezoelectric device may be configured with a plurality of piezoelectric rings 331 arranged on one face of the lens 310 along a radial direction.

A plurality of the piezoelectric rings 331 may be electrically connected to the controller 180 via a plurality of wires 332, respectively. In particular, a plurality of the wires 332 may be provided as a pattern to an inner circumference of the housing 301. Alternatively, a plurality of the wires 332 may be provided within a pipe 333.

The pipe 333 may be provided within the housing 301 or to an outer circumference of the housing 301. The pipe 333 may be provided as many as a number equal to or smaller than a maximum number required for lens control and the wires 332 may electrically contact with the corresponding lens via the pipe 333.

Figure 9:
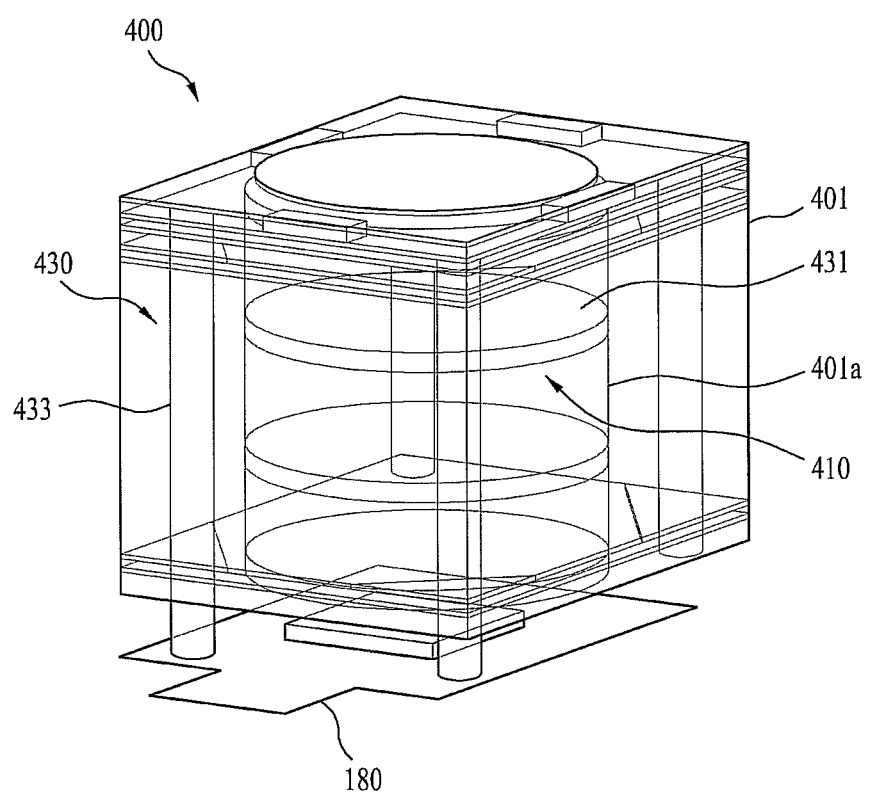
FIG. 9 is a perspective diagram to describe a zoom lens assembly according to an embodiment.

FIG. 9 is a perspective diagram to describe a zoom lens assembly 400 according to an embodiment. Other arrangements and embodiments may also be provided.

As shown in FIG. 9, a drive unit 430 may include a piezoelectric device mounted on a lens 410 and a plurality of ducts 433 electrically connecting the controller 180 to the corresponding piezoelectric device in a manner of being filled with a conductive paste (not shown).

A plurality of lenses 410 may be provided within a housing 401 by being fixed thereto individually or in one body.

The housing 401 may be able to fix (or maintain) positions of a plurality of the lenses 410 such that a plurality of the lenses 410 are spaced apart in a predetermined distance from each other. In particular, a plurality of the lenses 410 may include the lenses 211 to 213 of the zoom lens unit 210 (described with reference to FIG. 4) and may further include the focus compensation lens 221 of the compensation lens unit 220.

Both the zoom lens unit 210 and the compensation lens unit 220 may be received in the housing 401. The housing 401 may have a polyhedral or cylindrical configuration and may have a hole 401a provided to a position at which the lenses 410 are situated to be exposed along an optic axis.

The piezoelectric device may be provided to a circumferential portion of each of the lenses, as described with reference to FIG. 4. Alternatively, the piezoelectric device may be provided to one face of each of the lenses, as described with reference to FIG. 5. FIG. 9 shows a case that the piezoelectric device is provided to one face of each of the lenses.

The piezoelectric device may be configured with a plurality of piezoelectric rings 431 arranged on one face of the lens 410 along a radial direction.

A plurality of the piezoelectric rings 431 may be electrically connected to the controller 180 via the conductive paste that fills the duct 433.

The duct 433 may contact a circumferential portion of the lens 410 and the conductive paste inside the duct 433 may be electrically connected to the piezoelectric ring 431.

Embodiments may be directed to a zoom lens assembly and/or a mobile terminal that includes the zoom lens assembly that substantially obviate one or more problems due to limitations and disadvantages of related art.

An embodiment may provide a zoom lens assembly and/or a mobile, by which an image can be enlarged or reduced without shifting a position of a lens set.

An embodiment may provide a zoom lens assembly and/or a mobile terminal, by which a volume (or size) of a camera may be decreased.

An embodiment may provide a zoom lens assembly and a mobile terminal, by which a better use of a space may be made.

An embodiment may provide a mobile terminal, by which performance of a speaker module may increased by increasing a resonant space of the speaker module.

A zoom lens assembly may include a housing, a zoom lens unit (that includes a plurality of lenses stationarily arranged within the housing by being spaced apart in prescribed distance from each other along an optic axis, a plurality of the lenses respectively having variable refractive indexes without a position shift), a drive unit to pressurize a prescribed one of the lenses to vary the refractive index of the prescribed lens, and a controller to control the drive unit to change a focal distance of the zoom lens unit to enlarge or reduce an image.

A zoom lens assembly may also include a housing, and a zoom lens unit that includes a plurality of lenses stationarily arranged within the housing by being spaced apart in prescribed distance from each other along an optic axis, and a plurality of the lenses respectively having variable refractive indexes without a position shift. The zoom lens assembly may also include a drive unit to apply an electric signal to a prescribed one of the lenses to vary the refractive index of the prescribed lens, and a controller to control the drive unit to change a focal distance of the zoom lens unit to enlarge or reduce an image.

A mobile terminal may include a camera that includes a housing, a zoom lens unit that includes a plurality of lenses stationarily arranged within the housing by being spaced apart in prescribed distance from each other along an optic axis, and a plurality of the lenses respectively having variable refractive indexes without a position shift. The camera may also include a drive unit configured to apply a pressure or an electric signal to a prescribed one of the lenses to vary the refractive index of the prescribed lens. The mobile terminal may also include a display to display an image taken via the camera, and a controller to control the drive unit to change a focal distance of the zoom lens unit to enlarge or reduce the image.

Embodiments may provide effects and/or advantages.

A mobile terminal according to one embodiment may raise a performance of a speaker module by increasing a resonant space of the speaker module.

A mobile terminal according to one embodiment may make better use of a space, thereby slimming an overall thickness of the mobile terminal.

Accordingly, embodiments may provide effects and/or advantages. An image can be enlarged or reduced without shifting a position of a lens set. A volume of a camera may be decreased. Still further, a better use of a space may be made.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A zoom lens assembly, comprising:
a housing;

a zoom lens unit that includes a plurality of lenses stationarily arranged within the housing by being spaced apart from each other along an optic axis, and the plurality of the lenses respectively have refractive indexes that vary without a position shift of the plurality of the lens;

a drive unit to pressurize a prescribed one of the lenses and vary the refractive index of the prescribed lens;

a controller to control the drive unit to change a focal distance of the zoom lens unit to enlarge an image or to reduce an image, wherein the drive unit includes:
   a piezoelectric device provided on the prescribed tens; and
   a plurality of ducts filled with a conductive paste to electrically connect the controller to the corresponding piezoelectric device.

2. The zoom lens assembly of claim 1, wherein each of the plurality of lenses is formed of a polymer.

3. The zoom lens assembly of claim 2, wherein the drive unit includes a piezoelectric device to pressurize the prescribed lens along a radial direction of the prescribed lens or in a direction of the optic axis.

4. The zoom lens assembly of claim 1, wherein the drive unit includes a plurality of piezoelectric rings provided at one face of the prescribed lens along a radial direction.

5. The zoom lens assembly of claim 4, wherein the controller transmits an electric signal to each of the piezoelectric rings to enable the one face of the prescribed lens to have a plurality of curvatures along the radial direction.

6. The zoom lens assembly of claim 1, further comprising a temperature sensor to sense a temperature, wherein the controller compensates for a focal position of the zoom lens unit based on the sensed temperature.

7. The zoom lens assembly of claim 1, wherein the piezoelectric device includes a plurality of piezoelectric rings provided at one face of the prescribed lens along a radial direction.

8. The zoom lens assembly of claim 1, wherein the plurality of the ducts contact a circumferential portion of the prescribed lens.

9. The zoom lens assembly of claim 1, further comprising a compensation lens unit having a focus compensation lens to focus an image plane, wherein a distance between the zoom lens unit and the compensation lens unit is maintained during the enlarging or reducing of the image.

10. A mobile terminal comprising:
a camera having the zoom lens assembly of claim 1; and
a display to display an image taken by the camera.

11. A zoom lens assembly, comprising:
a housing;
a zoom lens unit that includes a plurality of lenses stationarily arranged within the housing by being spaced apart from each other along an optic axis, and the plurality of the lenses respectively have refractive indexes that vary without a position shift of the plurality of the lens;

a drive unit to apply an electric signal to a prescribed one of the lenses to vary the refractive index of the prescribed lens; and a controller to control the drive unit to change a focal distance of the zoom lens unit to enlarge an image or to reduce an image, wherein the drive unit includes:
   a piezoelectric device provided on the prescribed lens; and
   a plurality of ducts filled with a conductive paste to electrically connect the controller to the corresponding piezoelectric device.

12. The zoom lens assembly of claim 11, wherein each of the lenses is formed of a liquid crystal.

13. The zoom lens assembly of claim 12, further comprising a terminal to electrically connect the drive unit and the controller.

14. The zoom lens assembly of claim 11, further comprising a compensation lens unit having a focus compensation lens to focus an image plane, wherein a distance between the zoom lens unit and the compensation lens unit is maintained during the enlarging or reducing of the image.

15. The zoom lens assembly of claim 11, wherein the drive unit includes a plurality of piezoelectric rings provided at one face of the prescribed lens along a radial direction.

16. The zoom lens assembly of claim 15, wherein the controller transmits an electric signal to each of the piezoelectric rings to enable the one face of the prescribed lens to have a plurality of curvatures along the radial direction.

17. A mobile terminal, comprising:
a camera having the zoom lens assembly of claim 11; and
a display to display an image taken via the camera.

18. A zoom lens assembly, comprising:
a housing;
a zoom lens unit having a first lens provided at a first position along an optic axis and a second lens provided at a second position along the optic axis;
a drive unit to vary a refractive index of the first lens while the first lens remains at the first position along the optic axis and the second lens remains at the second position along the optic axis, wherein the drive unit varies the refractive index of the first lens by pressurizing the first lens or an electric signal is applied to the first lens; and
a controller to control the drive unit to change a focal distance of the zoom lens unit to enlarge an image or to reduce an image, wherein the drive unit includes:
   a piezoelectric device provided on the first lens; and
   a plurality of ducts filled with a conductive paste to electrically connect the controller to the corresponding piezoelectric device.

\* \* \* \* \*